Figure 4:
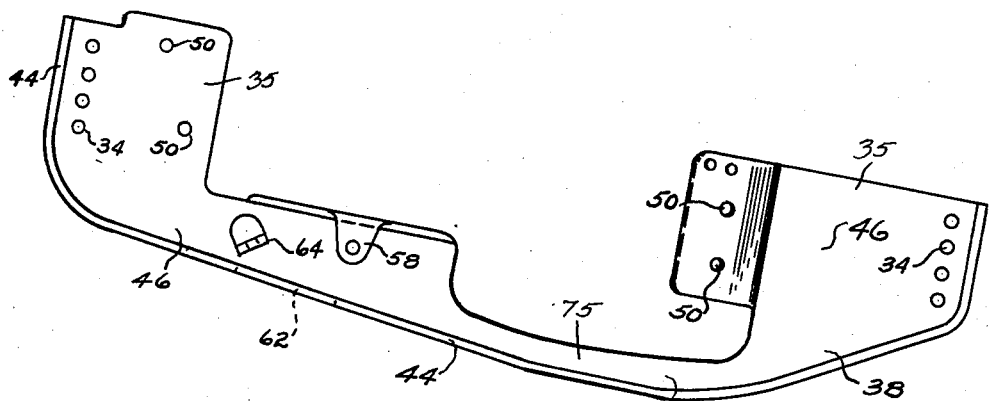

Nov. 25, 1958     T. B. FUNK     2,861,410
ROTARY DISC TYPE MOWER CONSTRUCTION
Filed Aug. 26, 1953     2 Sheets-Sheet 1

INVENTOR
TRUMAN B. FUNK

BY
ATTORNEY

Nov. 25, 1958 T. B. FUNK 2,861,410
ROTARY DISC TYPE MOWER CONSTRUCTION
Filed Aug. 26, 1953 2 Sheets-Sheet 2

INVENTOR
TRUMAN B. FUNK
BY Truman B. Beaman
ATTORNEY

United States Patent Office 2,861,410
Patented Nov. 25, 1958

2,861,410
ROTARY DISC TYPE MOWER CONSTRUCTION

Truman B. Funk, Jackson, Mich., assignor to Yard-Man, Inc., Jackson, Mich., a corporation of Michigan Application August 26, 1953, Serial No. 376,557

3 Claims. (Cl. 56—25.4)

The present invention relates to improvements in construction of lawn mowers of the rotary type, being an improvement over the construction shown in my co-pending applications Serial No. 158,243, filed April 26, 1950, and Serial No. 265,599, filed January 9, 1952, now Patent No. 2,748,553 and 2,742,750, respectively.

Lawn mowers of the rotary cutter type having a prime mover for driving a cutting blade mounted upon a substantially vertical drive shaft are generally supported on two or more wheels for traversing the cutting blade substantially parallel to the ground. To protect the operator from the cut material and to define its course of discharge, an open bottom housing is usually provided which constitutes a shroud for the cutting blade as well as the frame for the prime mover and the carriage structure.

The mounting of the carriage structure from the open bottom housing in prior constructions on the market has left much to be desired from the standpoint or rigidity, cost of manufacture and ease of adjustment for height of cut.

According to the present invention, a pair of rigid truss members are disposed, preferably, in spaced parallelism and extending in the direction of travel of the mower over the ground. The ground wheels are adjustably attached at opposite ends of these members; the design of the members being such that they have a great amount of both longitudinal and transverse rigidity. Preferably, the operating handle is also connected directly to the truss members as well as the adjustable stops for the handle for raising the front end of the mower by depressing the handle.

A cross structure for the truss members is provided by the open bottom housing which is preferably suspended from and between them.

Thus, an object of the invention is to provide an improved rotary lawn mower construction in which a pair of truss members is employed for mounting the carriage structure and between which the shroud and support for the rotary mechanism is suspended.

Another object is to provide an improved lawn mower construction of the type described in which an open bottom housing carrying the cutting mechanism is suspended between a pair of parallel truss members carrying the ground wheels at opposite ends.

Another object is to provide an improved construction in lawn mowers of the rotary type in which the wheels and operating handle are carried by a pair of spaced truss members between which the remaining part of the mower is suspended.

These and other objects and advantages residing in the combination, construction and arrangement of component parts will more fully appear from the following specification and the appended claims.

Figure 5:
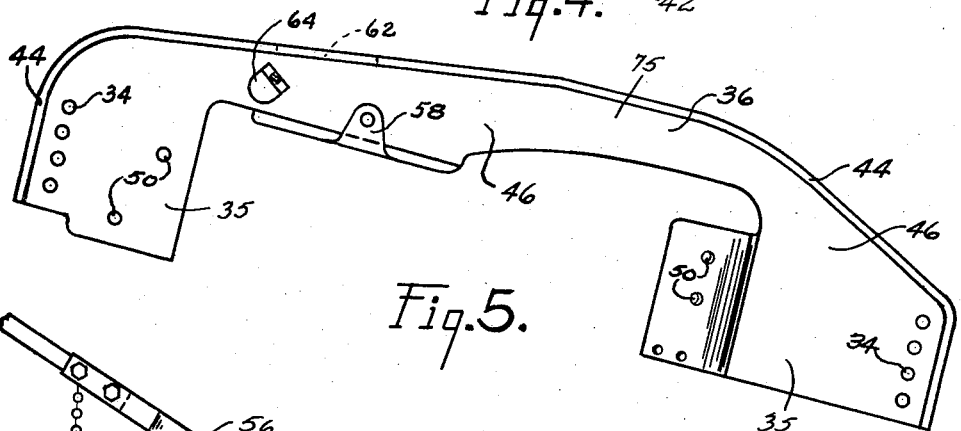
Figure 1:
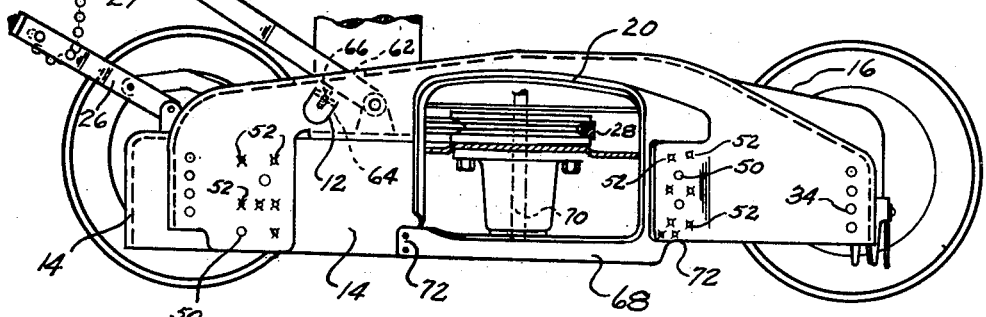
Figures 2, 3:
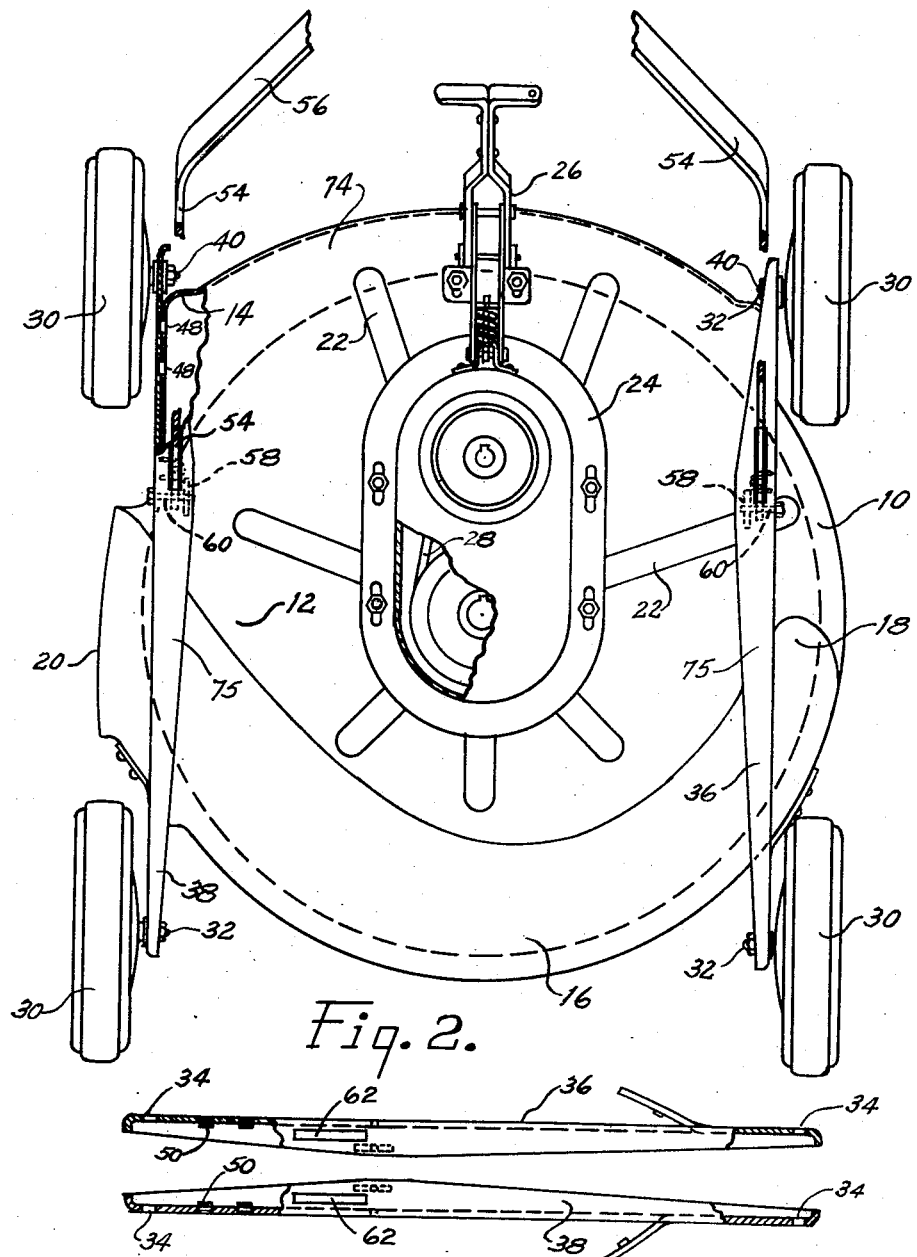

In the drawings,

Fig. 1 is a side elevational view of a rotary lawn mower with a pair of side wheels removed as well as the engine structure, Fig. 2 is a plan view of the construction shown in Fig. 1 with parts thereof shown in broken section, Fig. 3 is a plan view, partially shown in broken section, of the pair of truss members prior to assembly, Fig. 4 is a view of one of the truss members taken from the inside, and Fig. 5 is a view similar to Fig. 4 of the other of the truss members.

As shown, the rotary lawn mower construction comprises an open bottom housing 10, which in production is drawn from a single blank of sheet metal, having a generally flat top 12, depending sides 14, and a curvilinear discharge tunnel 16 formed upwardly from the top 12 with a gradual rise starting at 18 and extending to the discharge exit 20. Stiffening ribs 22 are shown formed in the flat top 12. The movable base 24 for the engine (not shown) and the shifter mechanism 26 to tighten and loosen the drive belt 28, constitutes no part of the present invention, being more fully described in my co-pending application Serial No. 265,599, filed January 9, 1952, now Patent No. 2,742,750.

Wheels 30 have stub axles 32 to be selectively received in any one of the series of holes 34 in the truss members 36 and 38 to vary the height of the cut; the ends of the axles 32 being threaded to receive nuts 40.

As more clearly shown in Figs. 3, 4 and 5, the truss members 36 and 38 are stamped from sheet metal, of reverse shape and similar in detail of construction except for the width of the web of the truss member 38 which has been slightly reduced at 42 to provide for the increased height of the tunnel 16 adjacent the exit 20. Transverse stiffener is provided for each truss member 36 and 38 by the flanges 44 with the web 46 providing the lonigtudinal stiffener.

For facile attachment of the truss members 36 and 38 to the housing 10 in production, the housing 10 is provided with locating holes 48 into which the locating slugs 50, partially punched from the webs 46 are received. Thus located, the truss members 36 and 38 are spot or projection welded to the housing 10 at 52 as shown in Fig. 1.

To mount the arms 54 of the guiding handle fork 56 the webs 46 are turned inwardly and then upwardly to form ears 58 spaced from the webs 46 to receive pivot bolts 60 extending between the webs 46 and the ears 58. Bolts 60 extending through suitable holes (not shown) in the ends of the arms 54 are employed to pivotally mount the handle fork 56 for movement within the clearance of the openings 62 in the flanges 44. To adjust the supported height of the handle fork 56, ears 64 are partially punched from the webs 46 to receive threaded abutments 66 which may be moved relative to the arms 54 with which they engage as shown in Fig. 1. A flexible chain 27 connected between the shifter 26 and the handle 56 permits operation of the shifter mechanism 26 in one direction through elevation of the handle 56 beyond the normal position of guiding.

A guard 68 shields the rotary cutting blade (not shown) on the shaft 70 at the exit 20, being held in position by screws 72.

It will be noted from Fig. 2 that the location of the truss members 36 and 38 and the mounting of the wheels 30 thereon is such that the width of the cut is substantialy equal to the spacing of the wheels. By designing the housing 12 slightly unbalanced to one side with respect to the path of the cutting blade tips as indicated by the dotted line circle 74, the side of the mower opposite the discharge 20 is particularly designed for trimming along the edge of an obstruction or wall. The manner in which the central arch portion 75 and depending portions 35 of each truss 36, 38 bridge the housing 10 also appears from Fig. 2.

By adjusting only the wheels 30 through selection of the holes 34, the height of cut of the mower may be varied as well as the plane of rotation of the blade relative to the ground with all the remaining structural members retained in their preferred position of relative locations.

Having thus described my invention what I claim is novel and desire to protect by Letters Patent is:

1. In a rotary type lawn mower, the combination with an open bottom cutter housing with a horizontally extending upper surface and depending sides and having a prime mover supported on said upper surface and driving a cutter within said housing, of carriage structure for said housing in the form of a pair of separate and spaced truss members each having a central arch portion disposed over said upper surface of said housing in bridging relation thereto and having depending portions adjacent each end thereof in juxtaposition to said depending sides and attached thereto to suspend said housing beneath said arch portions, and ground wheels mounted at the opposite ends of each of said truss members.

2. In a rotary type lawn mower as defined in the combination of claim 1, wherein one portion of said sides having an opening defined therein and disposed beneath the arch portion of one of said truss members.

3. In a rotary type lawn mower as defined in claim 1 wherein at least one of said truss members is spaced inwardly from the extreme width of said housing to provide a trimming edge.

References Cited in the file of this patent

UNITED STATES PATENTS

| | | |
|---|---|---|
| D. 168,064 | Morris et al. | Oct. 28, 1952 |
| 2,165,551 | Iverson | July 11, 1939 |
| 2,664,685 | Phelps | Jan. 5, 1954 |
| 2,706,372 | Blydenburgh | Apr. 19, 1955 |
| 2,719,396 | Morris et al. | Oct. 4, 1955 |